United States Patent
Zhou et al.

(10) Patent No.: US 9,772,442 B2
(45) Date of Patent: Sep. 26, 2017

(54) OPTICAL FILM ASSEMBLY MOUNTING STRUCTURE

(71) Applicant: Shenzhen China Star Optoelectronics Technology Co., Ltd., Shenzhen, Guangdong (CN)

(72) Inventors: Gege Zhou, Shenzhen (CN); GuoFu Tang, Shenzhen (CN); Yuchun Hsiao, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 678 days.

(21) Appl. No.: 14/360,613

(22) PCT Filed: May 8, 2014

(86) PCT No.: PCT/CN2014/077043
§ 371 (c)(1),
(2) Date: May 24, 2014

(87) PCT Pub. No.: WO2015/161531
PCT Pub. Date: Oct. 29, 2015

(65) Prior Publication Data
US 2016/0363718 A1    Dec. 15, 2016

(30) Foreign Application Priority Data
Apr. 24, 2014   (CN) .......................... 2014 1 0169815

(51) Int. Cl.
G02F 1/1335   (2006.01)
F21V 8/00     (2006.01)
G02F 1/1333   (2006.01)

(52) U.S. Cl.
CPC ......... *G02B 6/0088* (2013.01); *G02B 6/0081* (2013.01); *G02F 1/133308* (2013.01); *G02F 2001/133317* (2013.01)

(58) Field of Classification Search
CPC ................ G02B 6/0088; G02B 6/0081; G02F 1/133308; G02F 2001/133317
(Continued)

(56) References Cited

U.S. PATENT DOCUMENTS

| | | | |
|---|---|---|---|
| 8,636,373 B2 * | 1/2014 | Kunimochi | G02B 6/0028 349/63 |
| 2013/0235302 A1 * | 9/2013 | Jeon | G02B 6/0011 349/64 |

FOREIGN PATENT DOCUMENTS

| | | |
|---|---|---|
| CN | 201255800 Y | 6/2009 |
| JP | 2009016177 A | 1/2009 |

* cited by examiner

Primary Examiner — Charles Chang
(74) Attorney, Agent, or Firm — Andrew C. Cheng

(57) ABSTRACT

The present invention provides an optical film assembly mounting structure, which includes: a first mold frame (6), a second mold frame (8) arranged on the first mold frame (6), and an optical film assembly (9) arranged between the first and second mold frame (6, 8). The first mold frame (6) carries the optical film assembly (9) thereon and the second mold frame (8) is positioned on and presses down the optical film assembly (9) so as to achieve secure mounting of the optical film assembly (9). The first mold frame (6) includes an inclined first upper surface (61). The second mold frame (8) includes a first bottom surface (81) and a second bottom surface (83) connected to the first bottom surface and having an inclination angle identical to that of the first upper surface (61). The optical film assembly (9) is positioned on the first
(Continued)

upper surface (61) and the first and second bottom surfaces (81, 83) are positioned on and press down the optical film assembly (9).

15 Claims, 3 Drawing Sheets

(58) Field of Classification Search
USPC .......................................................... 349/64
See application file for complete search history.

OPTICAL FILM ASSEMBLY MOUNTING STRUCTURE

BACKGROUND OF THE INVENTION

1. Field of the Invention

The present invention relates to the field of liquid crystal displaying, and in particular to a mounting structure of an optical film assembly.

2. The Related Arts

Liquid crystal displays (LCDs) have a variety of advantages, such as thin device body, low power consumption, and being free of radiation, and are thus of wide applications, such as mobile phones, personal digital assistants (PDAs), digital cameras, computer monitors, and notebook computer screens.

Most of the liquid crystal displays that are currently available in the market are backlighting liquid crystal displays, which comprise an enclosure, a liquid crystal panel arranged in the enclosure, and a backlight module mounted in the enclosure. The structure of a conventional liquid crystal panel is composed of a color filter (CF) substrate, a thin-film transistor (TFT) array substrate, and a liquid crystal layer arranged between the two substrates and the principle of operation is that a driving voltage is applied to the two glass substrates to control rotation of the liquid crystal molecules of the liquid crystal layer in order to refract out light emitting from the backlight module to generate images. Since the liquid crystal panel itself does not emit light, light must be provided from the backlight module in order to normally display images. Thus, the backlight module is one of the key components of the liquid crystal displays. The backlight modules can be classified in two types, namely a side-edge backlight module and a direct backlight module, according to the site where light gets incident. The direct backlight module comprises a light source, such as a cold cathode fluorescent lamp (CCFL) or a light-emitting diode (LED), which is arranged at the backside of the liquid crystal panel to form a planar light source directly supplied to the liquid crystal display panel. The side-edge backlight module comprises an LED light bar, serving as a backlight source, which is arranged at an edge of a backplane to be located rearward of one side of the liquid crystal display panel. The LED light bar emits light that enters a light guide plate (LGP) through a light incident face at one side of the light guide plate and is projected out of a light emergence face of the light guide plate, after being reflected and diffused, to pass through an optic film assembly so as to form a planar light source for the liquid crystal panel.

With the popularization of bezel slimming of the liquid crystal displays, how an optical film assembly is mounted becomes extremely vital. Poor mounting may readily lead to poor homogeneity of backlighting and even leaking of the backlighting.

Referring to FIGS. 1 and 2, schematic views are given to illustrate a mounting structure of an optical film assembly at the light-incident side and non-light-incident side of a backlight module. The optical film assembly 700 is mounted under a mold frame 900 for both the light-incident side and the non-light-incident side. The mold frame 900 has a cross-sectional shape that is of a stepwise configuration having a bottom 901 and a step 903. The bottom 901 is a flat surface pressing down the optical film assembly 700 to achieve mounting of the optical film assembly 700. The step 903 carries and supports a liquid crystal display panel thereon. Such a mounting structure of the optical film assembly 700 is relatively simple; however, with the bezels of the liquid crystal display devices getting slimmer, the distance that is available for the mold frame 900 to hold and mount the optical film assembly 700 is getting shorter and this makes the optical film assembly 700 susceptible to detaching from the underside of the mold frame 900 so that optical issues including light leaking and inhomogeneity of brightness may occur.

Referring to FIGS. 3 and 4, schematic views are given to illustrate another mounting structure of an optical film assembly at the light-incident side and non-light-incident side of a backlight module, which is different from the optical film assembly mounting structure discussed above that the optical film assembly 700' is mounted above the mold frame 900' for both the light-incident side and the non-light-incident side. The mold frame 900' has a cross-sectional shape, which is of a dual-stepped configuration, comprising a first step 901' and a second step 903'. The first step 903' has a flat surface 905 and the optical film assembly 700' is positioned on the flat surface 905. The first step 901' supports the optical film assembly 700' and the second step 903' carries a liquid crystal display panel. Mounting the optical film assembly 700' in such a way, although overcoming the optical issues of light leaking and inhomogeneity of brightness, requires a complicated mounting structure, making the assembling process tedious and extended and the manufacturing performance poor.

SUMMARY OF THE INVENTION

An object of the present invention is to provide an optical film assembly mounting structure, which overcomes the optical issues of light leaking and inhomogeneity of brightness of a backlight module and is effectively in mounting an optical film assembly with the mounting structure simple and assembling easy.

To achieve the above object, the present invention provides an optical film assembly mounting structure, which comprises: a first mold frame, a second mold frame arranged on the first mold frame, and an optical film assembly arranged between the first and second mold frames. The first mold frame carries the optical film assembly thereon. The second mold frame is positioned on and presses down the optical film assembly so as to achieve secure mounting of the optical film assembly.

The first mold frame has a cross-sectional shape that is of a stepped configuration, comprising a first upper surface, a second upper surface, and the first connection surface connected between the first upper surface and the second upper surface. The first upper surface is an inclined surface, which is inclined downward from an end thereof connected to the first connection surface to an opposite end thereof. The optical film assembly is positioned on the first upper surface. The second upper surface supports the second mold frame thereon.

The second mold frame comprises a first bottom surface, a second bottom surface connected to the first bottom surface, and a third bottom surface connected to the second bottom surface. The first bottom surface is a horizontal surface positioned on and presses down the optical film assembly. The second bottom surface is an inclined surface and is positioned on and presses down the optical film assembly. The third bottom surface is supported on the second upper surface of the first mold frame.

The second bottom surface is arranged to incline downward from an end thereof connected to the third bottom surface to an end thereof connected to the first bottom surface. The second bottom surface has an inclination angle that is identical to an inclination angle of the first upper surface. The second upper surface of the first mold frame is a horizontal surface. The third bottom surface of the second mold frame is a horizontal surface.

The optical film assembly mounting structure further comprises a backplane, a light guide plate mounted on the backplane, a backlight source mounted to the backplane, a liquid crystal panel positioned on the second mold frame, and a front bezel mounted to and covering a circumferential edge of the liquid crystal panel. The backplane comprises a bottom board and a side board connected to an edge of the bottom board. The first mold frame is supported on the side board.

The first mold frame further comprises a first lower surface, a second lower surface, and a second connection surface connected between the first lower surface and the second lower surface. The first lower surface is supported on the light guide plate. The second lower surface is supported on the side board of the backplane. The first lower surface and the second lower surface are both horizontal surfaces.

The second mold frame further comprises a first top surface, a second top surface, and a third connection surface connected to the first and second top surfaces. The first top surface supports the liquid crystal panel thereon. The second top surface supports the front bezel thereon. The first and second top surfaces are both horizontal surfaces.

The side board of the backplane that supports the second lower surface of the first mold frame comprises the backlight source mounted thereto.

The optical film assembly mounting structure further comprises a bottom reflector plate. The light guide plate is arranged above the bottom board. The bottom reflector plate is arranged between the light guide plate and the bottom board.

The present invention also provides an optical film assembly mounting structure, which comprises: a first mold frame, a second mold frame arranged on the first mold frame, and an optical film assembly arranged between the first and second mold frames, the first mold frame carrying the optical film assembly thereon, the second mold frame positioned on and pressing down the optical film assembly so as to achieve secure mounting of the optical film assembly;

wherein the first mold frame has a cross-sectional shape that is of a stepped configuration, comprising a first upper surface, a second upper surface, and the first connection surface connected between the first upper surface and the second upper surface, the first upper surface being an inclined surface, which is inclined downward from an end thereof connected to the first connection surface to an opposite end thereof, the optical film assembly being positioned on the first upper surface, the second upper surface supporting the second mold frame thereon;

wherein the second mold frame comprises a first bottom surface, a second bottom surface connected to the first bottom surface, and a third bottom surface connected to the second bottom surface, the first bottom surface being a horizontal surface positioned on and pressing down the optical film assembly, the second bottom surface being an inclined surface and positioned on and pressing down the optical film assembly, the third bottom surface being supported on the second upper surface of the first mold frame; and wherein the second bottom surface is arranged to incline downward from an end thereof connected to the third bottom surface to an end thereof connected to the first bottom surface, the second bottom surface having an inclination angle that is identical to an inclination angle of the first upper surface, the second upper surface of the first mold frame being a horizontal surface, the third bottom surface of the second mold frame being a horizontal surface.

The optical film assembly mounting structure further comprises a backplane, a light guide plate mounted on the backplane, a backlight source mounted to the backplane, a liquid crystal panel positioned on the second mold frame, and a front bezel mounted to and covering a circumferential edge of the liquid crystal panel. The backplane comprises a bottom board and a side board connected to an edge of the bottom board. The first mold frame is supported on the side board.

The first mold frame further comprises a first lower surface, a second lower surface, and a second connection surface connected between the first lower surface and the second lower surface. The first lower surface is supported on the light guide plate. The second lower surface is supported on the side board of the backplane. The first lower surface and the second lower surface are both horizontal surfaces.

The second mold frame further comprises a first top surface, a second top surface, and a third connection surface connected to the first and second top surfaces. The first top surface supports the liquid crystal panel thereon. The second top surface supports the front bezel thereon. The first and second top surfaces are both horizontal surfaces.

The side board of the backplane that supports the second lower surface of the first mold frame comprises the backlight source mounted thereto.

The optical film assembly mounting structure further comprises a bottom reflector plate. The light guide plate is arranged above the bottom board. The bottom reflector plate is arranged between the light guide plate and the bottom board.

The efficacy of the present invention is that the present invention provides an optical film assembly mounting structure, in which an optical film assembly is mounted between first and second mold frames. The first mold frame comprises a first upper surface and the second mold frame comprises a first bottom surface and a second bottom surface that is connected to the first bottom surface and has the same inclination angle as the first upper surface, wherein the first upper surface caries the optical film assembly thereon and the first and second bottom surfaces are positioned on and press down the optical film assembly so as to achieve effective and secure mounting of the optical film assembly, preventing the optical film assembly from detaching, eliminating the optical issues of leaking of backlighting and inhomogeneity of brightness, improving displaying quality, allowing the subsequent assembling operation to be carried out easily, and increasing the manufacturing efficiency.

For better understanding of the features and technical contents of the present invention, reference will be made to the following detailed description of the present invention and the attached drawings. However, the drawings are provided for the purposes of reference and illustration and are not intended to impose limitations to the present invention.

BRIEF DESCRIPTION OF THE DRAWINGS

The technical solution, as well as other beneficial advantages, of the present invention will be apparent from the following detailed description of embodiments of the present invention, with reference to the attached drawing. In the drawing.

DETAILED DESCRIPTION OF THE PREFERRED EMBODIMENTS

To further expound the technical solution adopted in the present invention and the advantages thereof, a detailed description is given to a preferred embodiment of the present invention and the attached drawings.

Figure 1:
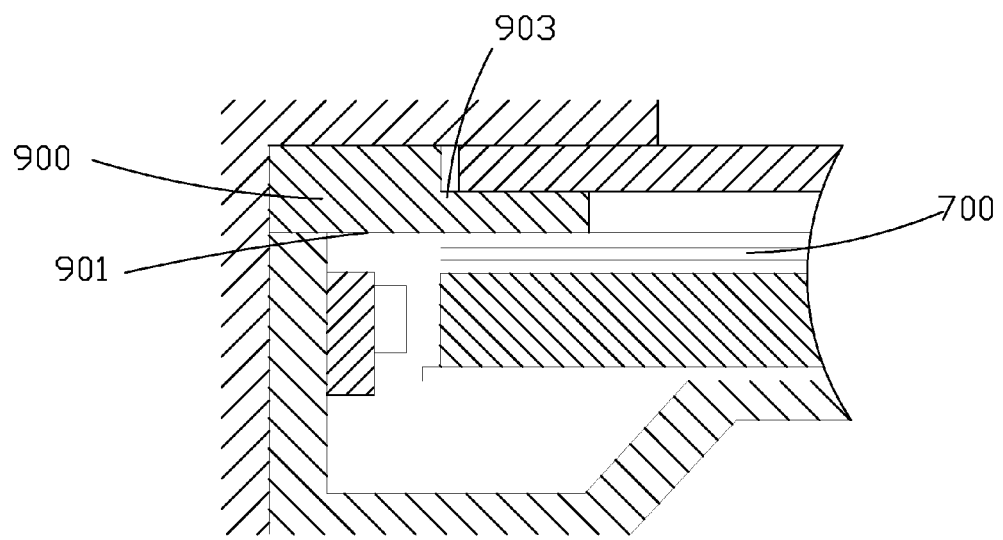
FIG. 1 is a schematic view showing a conventional mounting structure of an optical film assembly at a light-incident side of a backlight module.
Figure 2:
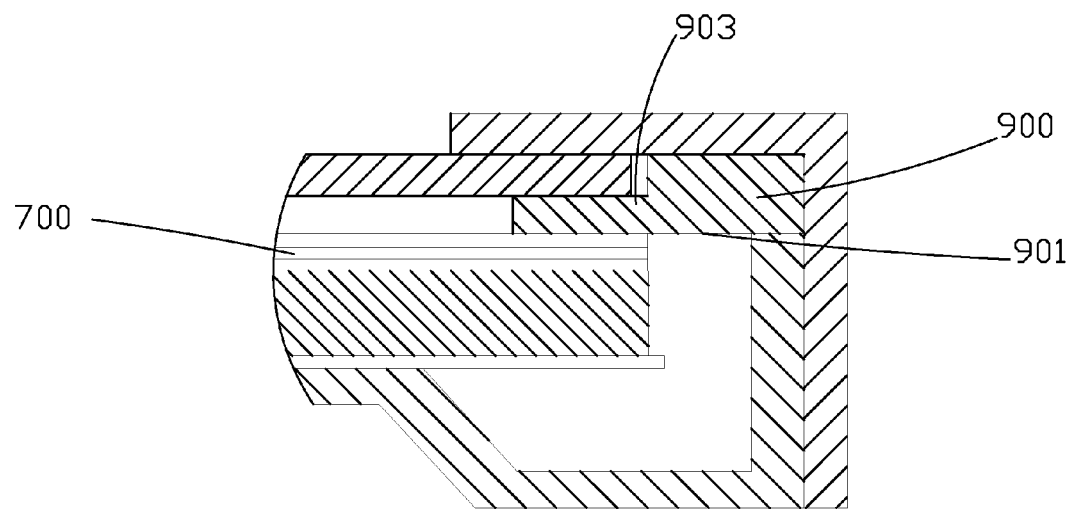
FIG. 2 is a schematic view showing the conventional mounting structure of the optical film assembly at a non-light-incident side of the backlight module.
Figure 3:
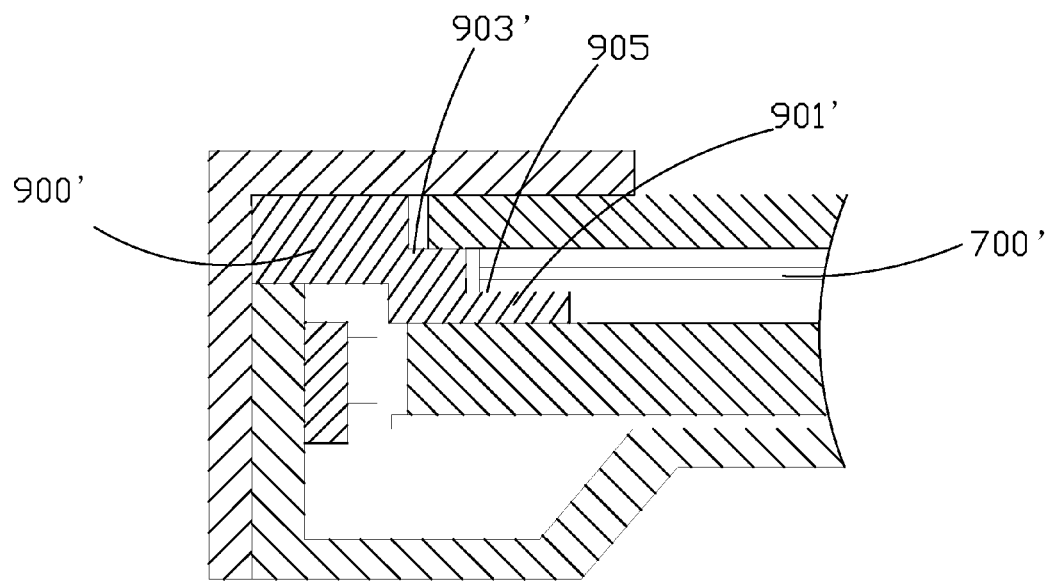
FIG. 3 is a schematic view showing another conventional mounting structure of an optical film assembly at a light-incident side of a backlight module.
Figure 4:
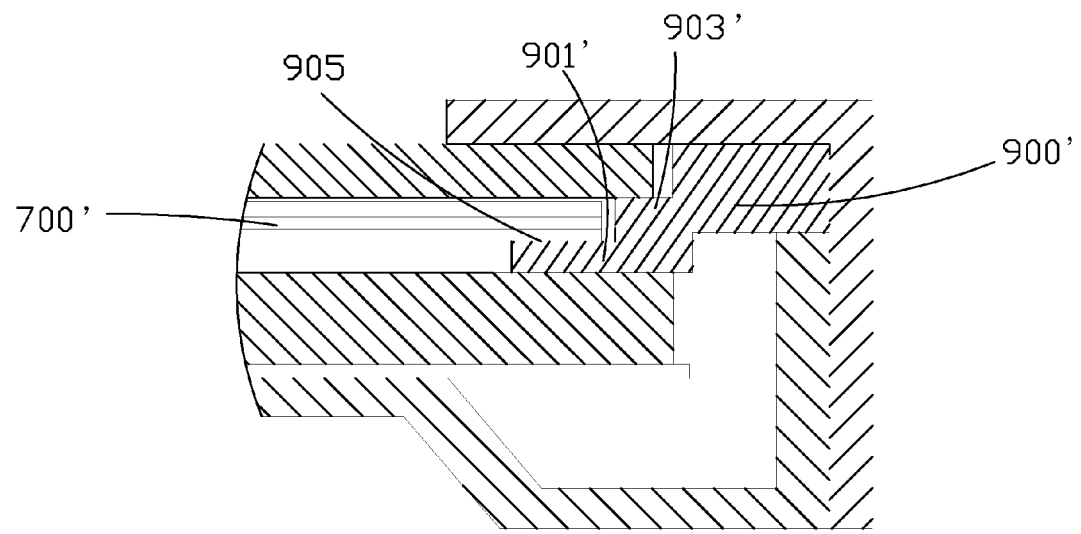
FIG. 4 is a schematic view showing said another conventional mounting structure of the optical film assembly at a light-incident side of the backlight module.
Figure 5:
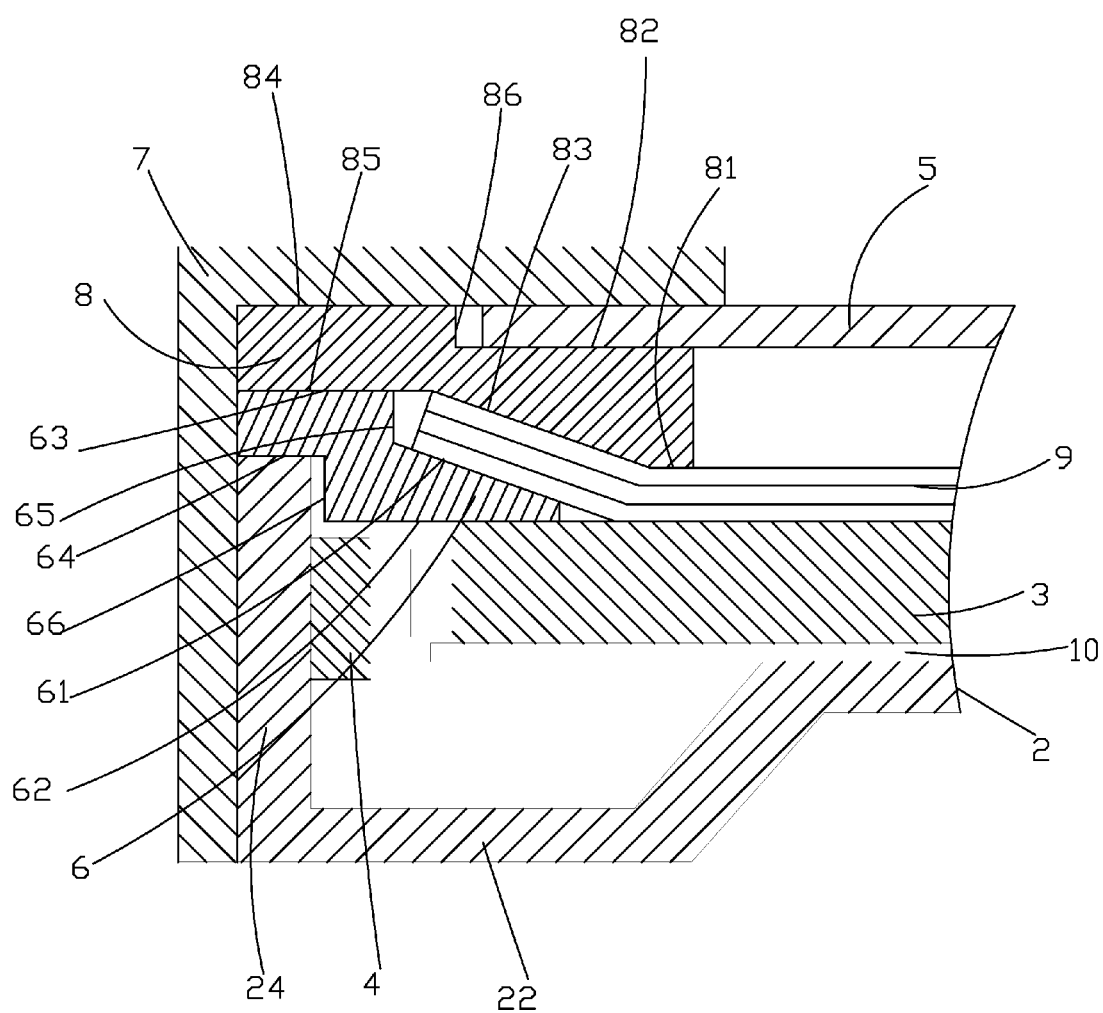
FIG. 5 is a schematic view showing an optical film assembly mounting structure according to the present invention.

Referring to FIG. 5, the present invention provides an optical film assembly mounting structure, which comprises: a first mold frame 6, a second mold frame 8 arranged on the first mold frame 6, and an optical film assembly 9 arranged between the first and second mold frames 6, 8. The first mold frame 6 carries the optical film assembly 9 thereon and the second mold frame 8 is positioned on and presses down the optical film assembly 9 so as to achieve secure mounting of the optical film assembly 9.

The optical film assembly mounting structure further comprises a backplane 2, a light guide plate 3 mounted on the backplane 2, a backlight source 4 mounted to the backplane 2, a liquid crystal panel 5 positioned on the second mold frame 8, and a front bezel 7 mounted to and covering a circumferential edge of the liquid crystal panel 5. The backplane 2 comprises a bottom board 22 and a side board 24 connected to an edge of the bottom board.

Specifically, the first mold frame 6 has a cross-sectional shape that is of a stepped configuration, comprising a first upper surface 61, a second upper surface 63, and the first connection surface 65 connected between the first upper surface 61 and the second upper surface 63. The first upper surface 61 is an inclined surface, which is inclined downward from an end thereof connected to the first connection surface 65 to an opposite end thereof to receive the optical film assembly 9 to be positioned thereon. The second upper surface 63 is a horizontal surface that supports the mold frame 8 thereon.

The first mold frame 6 further comprises a first lower surface 62, a second lower surface 64, and a second connection surface 66 connected between the first lower surface 62 and the second lower surface 64. The first lower surface 62 and the second lower surface 64 are both horizontal surfaces. The first lower surface 62 is supported on the light guide plate 3, while the second lower surface 64 is supported on the side board 24 of the backplane 2.

The second mold frame 8 comprises a first bottom surface 81, a second bottom surface 83 connected to the first bottom surface, and a third bottom surface 85 connected to the second bottom surface 83. The first bottom surface 81 is a horizontal surface, which is positioned on and presses down the optical film assembly 9 so as to have the optical film assembly 9 abutting the light guide plate 3. The second bottom surface 83 is an inclined surface, which is arranged to incline downward from an end thereof connected to the third bottom surface 85 to an end thereof connected to the first bottom surface 81. The second bottom surface 83 has an inclination angle that is identical to an inclination angle of the first upper surface 61 and is positioned on and presses down the optical film assembly 9 to have the optical film assembly 9 abutting the first upper surface 61 of the first mold frame 6. The third bottom surface 85 is a horizontal surface, which is supported on the second upper surface 63 of the first mold frame 6.

The second mold frame 8 further comprises a first top surface 82, a second top surface 84, and a third connection surface 86 connected to the first and second top surfaces 82, 84. The first and second top surfaces 82, 84 are both horizontal surfaces. The first top surface 82 supports the liquid crystal panel 5 thereon and the second top surface 84 supports the front bezel 7 thereon.

The side board 24 of the backplane 2 that supports the second lower surface 64 of the first mold frame 6 comprises the backlight source 4 mounted thereto.

Since the optical film assembly 9 is positioned on the first upper surface 61 of the first mold frame 6 and since the first bottom surface 81 and the second bottom surface 83 of the second mold frame 8 are both positioned on and press down the optical film assembly 9, the optical film assembly 9 is securely mounted between the first mold frame 6 and the second mold frame 8. The first mold frame 6 is located under the optical film assembly 9 so that the first lower surface 62 of the first mold frame 6 shields the light emitting from the backlight source 4 to thereby eliminate the optical issues of light leaking and inhomogeneity of brightness. The second mold frame 8 is located on the optical film assembly 9 so that the first and second bottom surfaces 81, 83 of the second mold frame 8 press tightly down the optical film assembly 9 to prevent the optical film assembly 9 from detaching, allowing subsequent assembling operation to be carried out easily. Further, since the first upper surface 61 and the second bottom surface 83 have the same inclination angle, the optical film assembly 9 may have a smooth transition at this site, thereby preventing introducing internal stress and preventing the optical film assembly 9 from wrinkling so as to ensure displaying quality.

It is noted that the optical film assembly mounting structure may further comprise a bottom reflector plate 10. The light guide plate 3 is arranged above the bottom board 22 and the bottom reflector plate 10 is arranged between the light guide plate 3 and the bottom board 22.

In summary, the present invention provides an optical film assembly mounting structure, in which an optical film assembly is mounted between first and second mold frames. The first mold frame comprises a first upper surface and the second mold frame comprises a first bottom surface and a second bottom surface that is connected to the first bottom surface and has the same inclination angle as the first upper surface, wherein the first upper surface caries the optical film assembly thereon and the first and second bottom surfaces are positioned on and press down the optical film assembly so as to achieve effective and secure mounting of the optical film assembly, preventing the optical film assembly from detaching, eliminating the optical issues of leaking of backlighting and inhomogeneity of brightness, improving displaying quality, allowing the subsequent assembling operation to be carried out easily, and increasing the manufacturing efficiency.

Based on the description given above, those having ordinary skills of the art may easily contemplate various changes and modifications of the technical solution and technical ideas of the present invention and all these changes and modifications are considered within the protection scope of right for the present invention.

What is claimed is:

1. An optical film assembly mounting structure, comprising: a first mold frame, a second mold frame arranged on the first mold frame, and an optical film assembly arranged between the first and second mold frames, the first mold frame carrying the optical film assembly thereon, the second mold frame positioned on and pressing down the optical film assembly so as to achieve secure mounting of the optical film assembly;

wherein the first mold frame comprises a first inclined surface and the second mold frame comprises a second inclined surface that faces the first inclined surface and a horizontal surface such that an inclined portion of the optical film assembly is interposed between and secured in position by the first inclined surface of the first mold frame and the second inclined surface of the second mold frame and a horizontal portion of the optical film assembly is interposed between and secured in position by the horizontal surface of the second mold frame and a horizontal surface of a light guide plate that extends in a horizontal direction.

2. The optical film assembly mounting structure as claimed in claim 1, wherein the first mold frame has a cross-sectional shape that is of a stepped configuration, comprising a first upper surface, a second upper surface, and the first connection surface connected between the first upper surface and the second upper surface, the first upper surface being an inclined surface, which is inclined, with respect to a horizontal direction, downward from an end thereof connected to the first connection surface to an opposite end thereof to form the first inclined surface of the first mold frame, the optical film assembly being positioned on the first upper surface with the inclined portion thereof, the second upper surface supporting the second mold frame thereon.

3. The optical film assembly mounting structure as claimed in claim 2, wherein the second mold frame comprises a first bottom surface, a second bottom surface connected to the first bottom surface, and a third bottom surface connected to the second bottom surface, the first bottom surface being the horizontal surface and positioned on and pressing down the horizontal portion of the optical film assembly, the second bottom surface being an inclined surface inclining with respect to a horizontal direction to form the second inclined surface and positioned on and pressing down the inclined portion of the optical film assembly, the third bottom surface being supported on the second upper surface of the first mold frame.

4. The optical film assembly mounting structure as claimed in claim 3, wherein the second bottom surface is arranged to incline downward from an end thereof connected to the third bottom surface to an end thereof connected to the first bottom surface, the second bottom surface having an inclination angle that is identical to an inclination angle of the first upper surface, the second upper surface of the first mold frame being a horizontal surface, the third bottom surface of the second mold frame being a horizontal surface.

5. The optical film assembly mounting structure as claimed in claim 4 further comprising a backplane, on which the light guide plate is mounted, a backlight source mounted to the backplane, a liquid crystal panel positioned on the second mold frame, and a front bezel mounted to and covering a circumferential edge of the liquid crystal panel, the backplane comprising a bottom board and a side board connected to an edge of the bottom board, the first mold frame being supported on the side board.

6. The optical film assembly mounting structure as claimed in claim 5 further comprising a bottom reflector plate, the light guide plate being arranged above the bottom board, the bottom reflector plate being arranged between the light guide plate and the bottom board.

7. The optical film assembly mounting structure as claimed in claim 5, wherein the first mold frame further comprises a first lower surface, a second lower surface, and a second connection surface connected between the first lower surface and the second lower surface, the first lower surface being supported on the light guide plate, the second lower surface being supported on the side board of the backplane, the first lower surface and the second lower surface being both horizontal surfaces.

8. The optical film assembly mounting structure as claimed in claim 7, wherein the second mold frame further comprises a first top surface, a second top surface, and a third connection surface connected to the first and second top surfaces, the first top surface supporting the liquid crystal panel thereon, the second top surface supporting the front bezel thereon, the first and second top surfaces being both horizontal surfaces.

9. The optical film assembly mounting structure as claimed in claim 7, wherein the side board of the backplane that supports the second lower surface of the first mold frame comprises the backlight source mounted thereto.

10. An optical film assembly mounting structure, comprising: a first mold frame, a second mold frame arranged on the first mold frame, and an optical film assembly arranged between the first and second mold frames, the first mold frame carrying the optical film assembly thereon, the second mold frame positioned on and pressing down the optical film assembly so as to achieve secure mounting of the optical film assembly;

wherein the first mold frame comprises a first inclined surface and the second mold frame comprises a second inclined surface that faces the first inclined surface and a horizontal surface such that an inclined portion of the optical film assembly is interposed between and secured in position by the first inclined surface of the first mold frame and the second inclined surface of the second mold frame and a horizontal portion of the optical film assembly is interposed between and secured in position by the horizontal surface of the second mold frame and a horizontal surface of a light guide plate that extends in a horizontal direction;

wherein the first mold frame has a cross-sectional shape that is of a stepped configuration, comprising a first upper surface, a second upper surface, and the first connection surface connected between the first upper surface and the second upper surface, the first upper surface being an inclined surface, which is inclined, with respect to a horizontal direction, downward from an end thereof connected to the first connection surface to an opposite end thereof to form the first inclined surface of the first mold frame, the optical film assembly being positioned on the first upper surface with the inclined portion thereof, the second upper surface supporting the second mold frame thereon;

wherein the second mold frame comprises a first bottom surface, a second bottom surface connected to the first bottom surface, and a third bottom surface connected to the second bottom surface, the first bottom surface being the horizontal surface and positioned on and pressing down the horizontal portion of the optical film assembly, the second bottom surface being an inclined surface inclining with respect to a horizontal direction to form the second inclined surface and positioned on and pressing down the inclined portion of the optical film assembly, the third bottom surface being supported on the second upper surface of the first mold frame; and wherein the second bottom surface is arranged to incline downward from an end thereof connected to the third bottom surface to an end thereof connected to the first bottom surface, the second bottom surface having an inclination angle that is identical to an inclination angle of the first upper surface, the second upper surface of the first mold frame being a horizontal surface, the third bottom surface of the second mold frame being a horizontal surface.

11. The optical film assembly mounting structure as claimed in claim 10 further comprising a backplane, on which the light guide plate is mounted, a backlight source mounted to the backplane, a liquid crystal panel positioned on the second mold frame, and a front bezel mounted to and covering a circumferential edge of the liquid crystal panel, the backplane comprising a bottom board and a side board connected to an edge of the bottom board, the first mold frame being supported on the side board.

12. The optical film assembly mounting structure as claimed in claim 11 further comprising a bottom reflector plate, the light guide plate being arranged above the bottom board, the bottom reflector plate being arranged between the light guide plate and the bottom board.

13. The optical film assembly mounting structure as claimed in claim 11, wherein the first mold frame further comprises a first lower surface, a second lower surface, and a second connection surface connected between the first lower surface and the second lower surface, the first lower surface being supported on the light guide plate, the second lower surface being supported on the side board of the backplane, the first lower surface and the second lower surface being both horizontal surfaces.

14. The optical film assembly mounting structure as claimed in claim 13, wherein the second mold frame further comprises a first top surface, a second top surface, and a third connection surface connected to the first and second top surfaces, the first top surface supporting the liquid crystal panel thereon, the second top surface supporting the front bezel thereon, the first and second top surfaces being both horizontal surfaces.

15. The optical film assembly mounting structure as claimed in claim 13, wherein the side board of the backplane that supports the second lower surface of the first mold frame comprises the backlight source mounted thereto.

* * * * *